United States Patent [19]

Wong et al.

[11] Patent Number: 5,148,417
[45] Date of Patent: Sep. 15, 1992

[54] TRACKING JUMP COMPENSATOR FOR OPTICAL DISC REPRODUCING APPARATUS

[75] Inventors: Alan Wong, Tokyo; Katsuya Hori; Tadao Yoshida, both of Kanagawa, all of Japan

[73] Assignee: Sony Corporation, Tokyo, Japan

[21] Appl. No.: 513,224

[22] Filed: Apr. 23, 1990

[30] Foreign Application Priority Data

May 31, 1989 [JP] Japan .................................. 1-138220

[51] Int. Cl.$^5$ ............................................. G11B 17/22
[52] U.S. Cl. .................... 369/32; 369/44.28; 369/44.32; 360/78.11
[58] Field of Search ............. 369/32, 44.27, 44.28, 369/44.32, 43, 33; 360/78.04, 78.06, 78.07, 78.09, 78.11; 358/342

[56] References Cited

U.S. PATENT DOCUMENTS

| | | | |
|---|---|---|---|
| 4,796,247 | 1/1989 | Vogelsang | 369/44.28 |
| 4,860,272 | 8/1989 | Nishikawa et al. | 369/111 |
| 4,882,642 | 11/1989 | Tayler et al. | 360/78.11 |
| 4,932,018 | 6/1990 | Nagasawa et al. | 369/59 |
| 4,977,550 | 12/1990 | Furuya et al. | 369/32 |

Primary Examiner—Roy N. Envall, Jr.
Assistant Examiner—Thai Tran
Attorney, Agent, or Firm—Lewis H. Eslinger; Jay H. Maioli

[57] ABSTRACT

The present invention is concerned with an optical disk reproducing apparatus for reproducing digital data from an optical disk, such as an audio compact disk and, above all, with such apparatus in which a continuous playback output may be produced even when track jump should occur due to vibrations or the like. With the optical disk reproducing apparatus according to the present invention, digital data detected from an optical disk are sequentially written in a RAM for subsequent reading so that data stored in the RAM continue to be read even on the occurrence of the track jump to provide a continuous playback output. On the other hand, the optical disk is reproduced at an increased speed for a predetermined time period after the light spot irradiating the optical disk resets to its original position from track jump to replenish digital data to the RAM.

5 Claims, 5 Drawing Sheets

TRACKING JUMP COMPENSATOR FOR OPTICAL DISC REPRODUCING APPARATUS

BACKGROUND OF THE INVENTION

1. Field of the Invention

This invention relates to an optical disk reproducing apparatus for reproducing digital data from a disk and, more particularly, to such apparatus in which a continuous playback output may be obtained even on the occurrence of track jumps due to vibrations or the like.

2. Description of the Prior Art

In general, in a compact disk (CD), when a track jump should occur during reproduction due to, for example, vibrations of a pickup system, reproduction is discontinued or transiently interrupted to be restarted from some different position, thus imparting a disagreeable feeling to the listener or necessitating a redundant operation.

The prior art practice for reducing such track jump has been to provide a mechanical damper in the CD player to prevent the track jump due to vibrations, as disclosed for example in the Japanese Patent Publication No. 62-69897 (1987).

However, when such a mechanical damper is provided in the CD player to prevent track jump, the CD player becomes more complicated in structure and more expensive, while increasing in size and weight and rendering future retrofitting or remodelling difficult.

Moreover, when a strong impact is applied to the CD player, such impact cannot be absorbed causing the track jump of the pickup despite provision of the damper.

While it is also proposed to cope with the track jump by the corresponding signal processing as disclosed in Japanese Patent Publication No. 63-177321 (1988), the playback output in this case becomes discontinuous because the playback signal is not produced during track jump.

BRIEF SUMMARY OF THE INVENTION

It is a principal object of the present invention to provide an optical disk reproducing apparatus in which a continuous playback output may be obtained even on the occurrence of track jumps as a result of vibrations or the like.

According to the present invention, there is provided an optical disk reproducing apparatus in which an optical disk is rotated at a first rotational speed on the basis of first master clocks at the same time that digital data are reproduced from said optical disk, comprising memory means into and from which digital data detected from said optical disk are sequentially written and read out, respectively, track jump detection means detecting track jump of a light spot during reproduction from said optical disk, resetting means for resetting said light spot to a position just ahead track jump, second master clock generating means for generating second master clocks of a higher frequency than said first master clocks, and control means for continuously reading out digital data stored in said memory means on the basis of said first master clocks on detection of track jump by said track jump detection means, said control means causing rotation of said optical disk at a second speed higher than said first speed on the basis of said second master clocks for a predetermined period after resetting of said light spot by said resulting means for detecting digital data from said optical disk for writing the detected digital data in said memory means on the basis of said second master clocks.

Thus, with the optical disk reproducing apparatus according to the present invention, digital data detected from the optical disk rotating at a first speed on the basis of the first master clocks are sequentially written in memory means on the basis of the first master clocks so as to be read out and output after lapse of a time period not less than a time period at least necessary for the light spot to reset from track jump. Hence, on the occurrence of track jumps by the light spot, digital data previously stored in the memory means are continuously read on the basis of the first master clocks to provide the playback output without interruptions.

In addition, with the present optical disk reproducing apparatus, the optical disk is rotated for a predetermined time period after resetting of said light spot at a second speed higher than the above mentioned first speed on the basis of second master clocks having a higher frequency than that of said first master clocks for detecting digital data from the optical disk and writing the detected digital data in the memory means on the basis of the second master clocks. In this manner, the digital data read out from the memory means during the time period necessary for resetting from the track jump and hence depleted may be quickly replenished to the memory means.

DETAILED DESCRIPTION OF THE PREFERRED EMBODIMENTS

Figure 1:
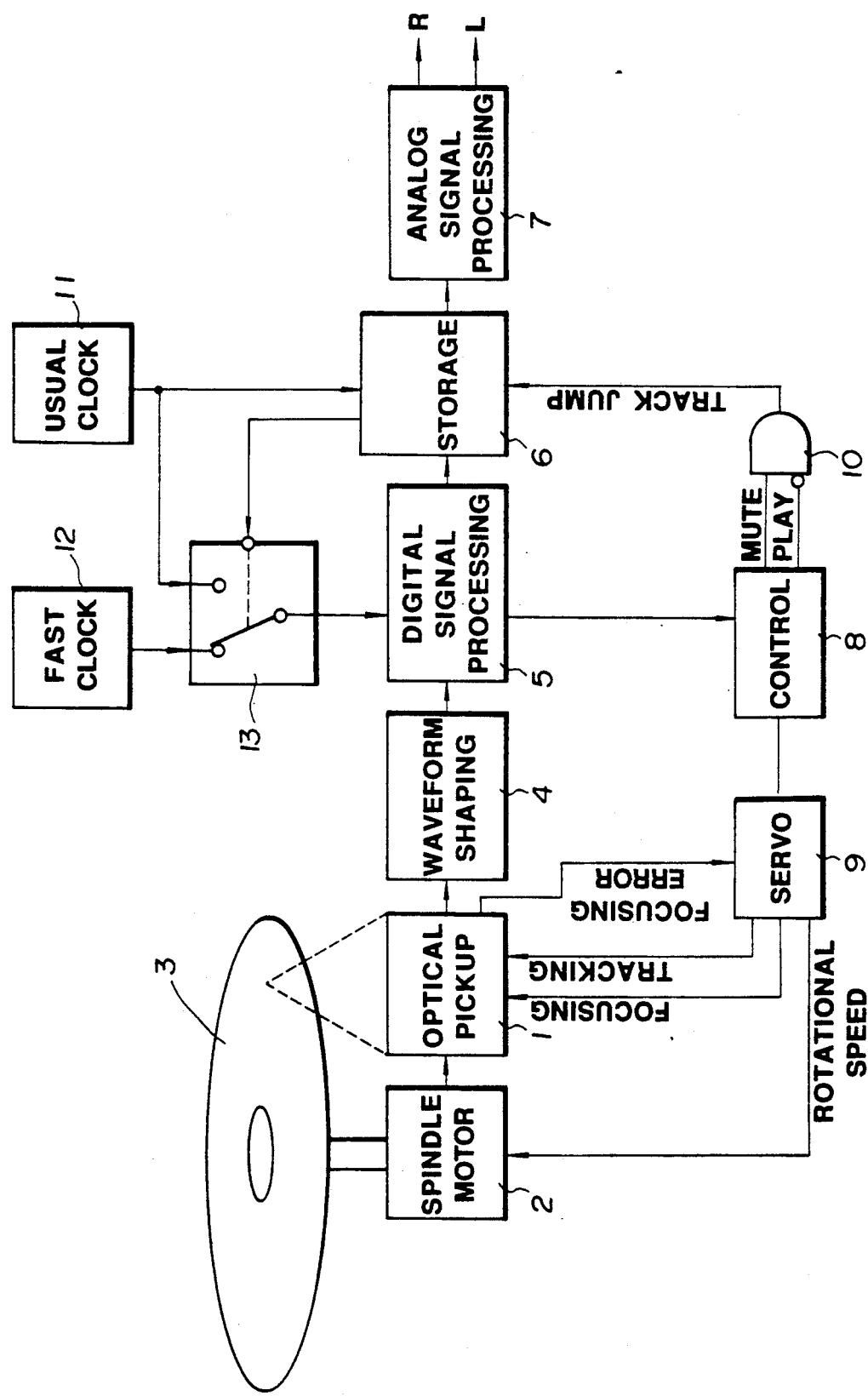
FIG. 1 is a block diagram showing the construction of a CD player according to a first embodiment of the present invention.

By referring to the drawings, two illustrative embodiments of the present invention applied to the CD player will be explained in detail.

FIG. 1 is a block diagram showing a CD player according to a first embodiment of the present invention.

An optical pickup 1 directs a light spot on a compact disk or CD 3, rotated by a spindle motor 2, to detect the presence or absence of pits therein to generate RF detection signals. These RF detection signals are processed in a waveform shaping circuit 4 and are thereby converted into digital data which are transmitted to a digital signal processing section 5 so as to be processed and converted into audio data. These audio data are supplied to a memory section 6 so as to be sequentially written and stored into a random access memory (RAM) provided in the memory section 6. The stored data are then sequentially read and transmitted to an analog signal processing section 7 where they are converted by digital to analog (D/A) conversion into analog signals and output as stereo audio signals.

In the digital signal processing section 5, sub-codes of digital data detected from CD 3 are detected and the detection output is transmitted to a control section 8. Based on the detection output, the control section 8 monitors the state of detection of the CD 3 to control a servo section 9 accordingly to apply a servo to optimize the rotational speed of the spindle motor 2 or the state of tracking of the light spot. An optimum focusing servo is applied in accordance with focusing error signals, supplied from the optical pickup 1 to the servo section 9.

The control section 8 outputs a mute signal which goes high when digital data cease to be produced regularly from CD 3 and a play signal which goes low when the CD player is operating in a playback mode. These mute and play signals are applied to a non-inverting input and an inverting input of an AND circuit 10 which then outputs to the memory section 6 a track jump detection signal which goes high when digital data are not produced regularly during the reproducing operation of the CD player, that is, when a track jump has occured.

The CD player is provided with two clock generators, a usual clock generator 11 generating first master clocks forming the basis of the normal reproducing operation and a fast clock generator 12 generating second master clocks having a frequency higher than in the first master clocks. The master clocks output from these clock generators 11, 12 are switchingly selected by a switching circuit 13 responsive to control signals supplied from the memory section 6 before being transmitted to the digital signal processing section 5 and thence to the memory section 6 and to the control section 8. The first master clocks from the usual clock generator 11 are continuously supplied to the memory section 6 and thence to the analog signal processing section 7 so as to form timing clocks for D/A conversion.

Figure 2:
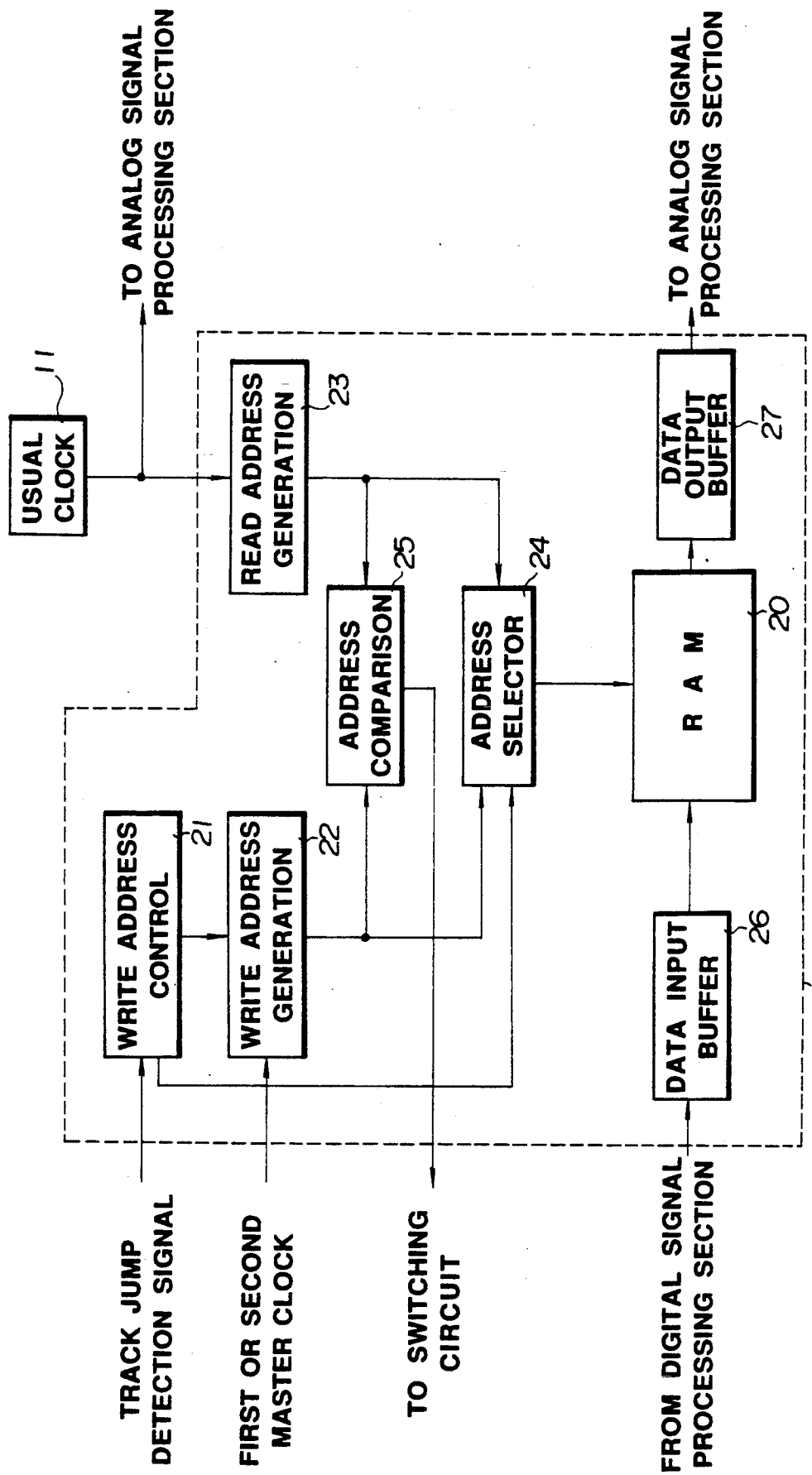
FIG. 2 is a block diagram showing the construction of a memory section of the CD player shown in FIG. 1.

Referring to FIG. 2, the memory section 6 includes a RAM 20 into and from which audio data supplied from the digital signal processing section 5 are written and read out, respectively, as well as a write address controller 21, a write address generator 22, a readout address generator 23, an address selector 24 and an address comparator 25 for generating write and readout address data supplied to RAM 20.

The write address controller 21 is supplied from the AND circuit 10 with the above mentioned track jump detection signal and controls the operation of the write address generator 22 and the operation of the address selector 24 in accordance with the track jump detection signals.

The first or second master clocks, supplied by way of the switching circuit 13, are supplied to the write address generator 22 from the digital signal processing section 5. The write address generator 22 generates write address data in timed relation with the master clocks which write address data are transmitted to the address selector 24 and the address comparator 25.

The first master clocks, generated in the usual clock generator 11, are directly transmitted to the readout address generator 23. The generator 23 generates address data in timed relation with the first master clocks, which address data are transmitted to the address selector 24 and to the address comparator 25.

Responsive to control signals supplied from the write address controller 21, the address selector 24 transmits the address data supplied from the address generators 22, 23 to RAM 20.

Responsive to write address data from address selector 24, the RAM 20 sequentially writes and stores audio data supplied from the digital signal processing section 5 by way of data input buffer 26. Responsive to readout address data supplied from the address selector 24, the RAM 20 sequentially reads out and outputs the stored audio data to transmit these audio data via data output buffer 27 to the analog signal processing section 7. The RAM 20 is required to have such a memory capacity that the audio data stored therein can be continuously supplied to the analog signal processing section 7 at least during the time necessary for the light spot to reset from the track jump, as will be explained in more detail later.

The address comparator 25 is responsive to the difference between address data supplied thereto from the address generators 22, 23 to transmit the control signal for the switching operation to the switching circuit 13.

Figure 3:
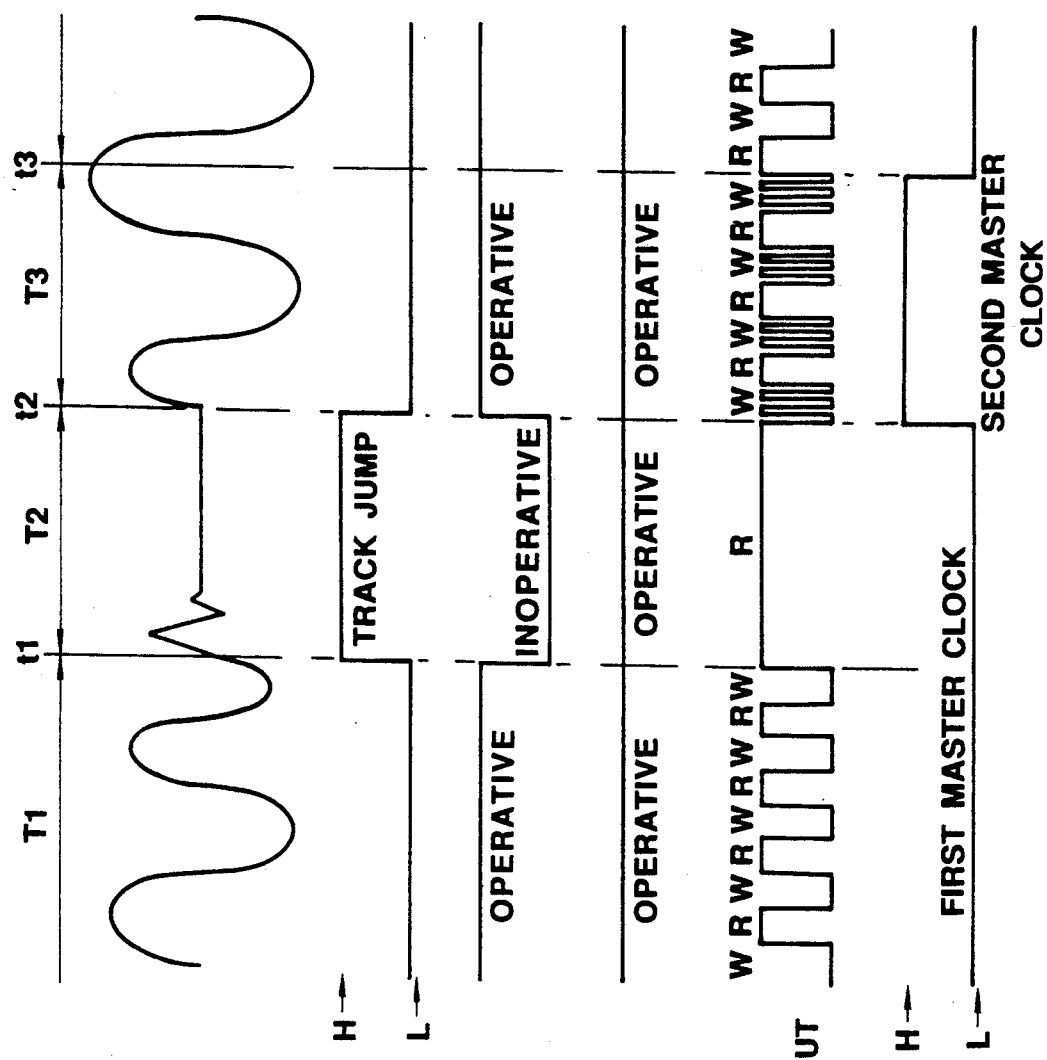
FIG. 3 consisting of A-F, is a time chart for illustrating the operation of the CD player shown, in FIG. 1 on the occurrence of a track jump.

Referring to FIG. 3, the operation of the above described CD player will be explained for the case wherein the track jump of the light spot has occurred during reproduction from the CD 3.

The time period $T_1$ shown in FIG. 3 shows the time period when the CD 3 is being reproduced regularly. In this case, the first master clocks generated in the usual clock generator 11 are supplied to the digital signal processing section 5 via switching circuit 13. Based on these first master clocks, the CD 3 is rotated at a first speed (normal playback speed) and, based on these first master clocks, digital data are reproduced from CD 3.

Since the normal playback output is produced at this time from CD 3 as shown at A in FIG. 3, a track jump detection signal of a low (L) level indicating that a regular playback operation is being performed as shown at B in FIG. 3 is supplied to the write address controller 21.

The write address controller 21 activates the write address generator 22 when the track jump detection signal is at the low level, as shown at C in FIG. 3. Since the first master clocks are supplied at this time to both the write address generator 22 and the readout address generator 23, address data synchronized to each other are generated at the address generators 22, 23. However, the readout address data formed in the readout address generator 22 becomes the same data as the write address data generated in the write address generator 23 after a delay of a predetermined time period longer than the time period necessary for the light spot to reset from the track jump.

When the track jump detection signal is at a low level, the write address controller 21 controls the address selector 24, as shown at E in FIG. 3, in such a manner that the write address data W generated in the write address generator 22 and the readout address data R generated at the readout address generator 23 will be transmitted alternately to RAM 20.

In this manner, the audio data supplied to RAM 20 are written into the address indicated by the write address data, and are read out by the readout address data so as to be output from RAM 20 after lapse of a time interval corresponding to the delay of the readout address data with respect to the write address data.

When the CD player undergoes vibrations at time $t_1$ in FIG. 3 during reproduction from CD 3, and the light spot has jumped over a track or tracks, by way of track jumps, abnormalities are produced in the playback output from CD 3, shown at A in FIG. 3. On detecting such track jump of the light spot from the abnormalities of the playback output, the controller 8 controls the servo section 9 to reset the light spot to a position just ahead of the position at which the track jump has occurred. Simultaneously, the controller 8 generates a high (H) level track jump detection signal indicating the track jump of the light spot at the AND gate 10 as shown at B in FIG. 3 and transmits the high level signal to the memory section 6.

When supplied with the above mentioned high level track jump detection signal, the write address controller 21 of the memory section 6 inactivates the write address generator 22, as shown at C in FIG. 3, interrupt the generation of the write address data. On the other hand, the readout address generator 23 continues its operation, as shown at D in FIG. 3, on the basis of the first master clocks supplied from the usual clock generator 11. The write address controller 21 controls the address selector 24, as shown at E in FIG. 3, to discontinue the supply of the write address data to RAM 20 to supply only the readout address data to RAM 20.

For this reason, since the time $t_1$ when the track jump has occurred, the abnormal audio data transmitted from the digital signal processing section 5 are not written into RAM 20. Only readout of the audio data previously written in RAM 20 before time $t_1$ is performed in the usual manner.

When the light spot resets at time $t_2$ in FIG. 3 to a position just ahead of track jump, a normal playback output starts again to be produced from CD 3, as shown at A in FIG. 3. This sets the track jump detection signal shown at B in FIG. 3 to a low (L) level indicating that track jump has not occurred. Thus the write address controller 21 reinitiates the operation of the write address generator 22, as shown at B in FIG. 3, to generate the write address data, while controlling the address selector 24, as shown at E in FIG. 3, to transmit the write address data and the readout address data to RAM 20.

As described hereinabove, no audio data are written in RAM 20 during the time period $T_2$ since time $t_1$ until time $t_2$ when the track jump has occurred, and only the readout of the audio data previously stored in RAM 20 is performed. Hence, at time $t_2$, the readout address data approaches to the above mentioned write address data, so that there is but little of the audio data written and stored therein.

In order to refill the RAM 20 with audio data the address comparator 25 compares the write address data with the readout address data and transmits to the switching circuit 13 a control signal which goes high as shown at F in FIG. 3 when the difference between the write address data and the readout address data is less than a predetermined value to cause the second master clock from the fast clock oscillator 12 to be supplied to the digital signal processing section 5.

In this manner, responsive to these second master clocks, rotation of the spindle motor 2 and data processing of digital data detected from the CD 3 are performed, such that the CD 3 is rotated at a second speed faster than the above mentioned first speed, that is, the usual playback speed, with the audio data being reproduced at an increased speed from CD 3.

The above second master clocks are also supplied to the write address generator 22, so that the write address data are generated at higher than usual speed, such that the audio data detected from the CD 3 are written in RAM 2 at an elevated speed in response to these write address data. For this reason, the audio data read out during the track jump time $T_2$ and thus depleted are replenished quickly in RAM 20.

When the difference between the write address data and the readout address data is equal to a predetermined value at time $t_3$ in FIG. 3, the output of the address comparator 25 is at the low (L) level, such that the first master clock output from the usual clock generator 11 is again transmitted to for example, the digital signal processing section 5 by means of the switching circuit 13. Thus, since time $t_3$, the various parts operate in the same manner as during time interval $T_1$ to reproduce the CD 3 under the normal state.

Meanwhile, during the time interval $T_3$ since time $t_2$ until time $t_3$ when the audio data are reproduced from CD 3 by the second master clocks, the first master clocks from the usual clock generator 11 are supplied to the readout address generator 23, so that the audio data stored in RAM 20 are read out in the usual manner. Similarly, the first master clocks are supplied to the analog signal processing section 7, so that the audio data read out from the RAM 20 are regularly converted into analog signals so as to be output perpetually continuously.

It will be seen that, with the CD player to which the present invention is applied, when the light spot has jumped over a track or tracks, as a result of vibrations or the like, the audio data may be continuously read out from RAM 20 to produce a continuous playback output. Moreover, by reproducing the CD 3 at an elevated speed for a predetermined time period $T_3$ following reversion of the light spot to a position just ahead of the track jump, audio data may be quickly replenished in the RAM 20 in readiness for the next track jump. For this reason, perpetually consecutive audio signals can be continuously output even when the CD player is employed under the conditions in which track jumps are likely to occur frequently.

Figure 4:
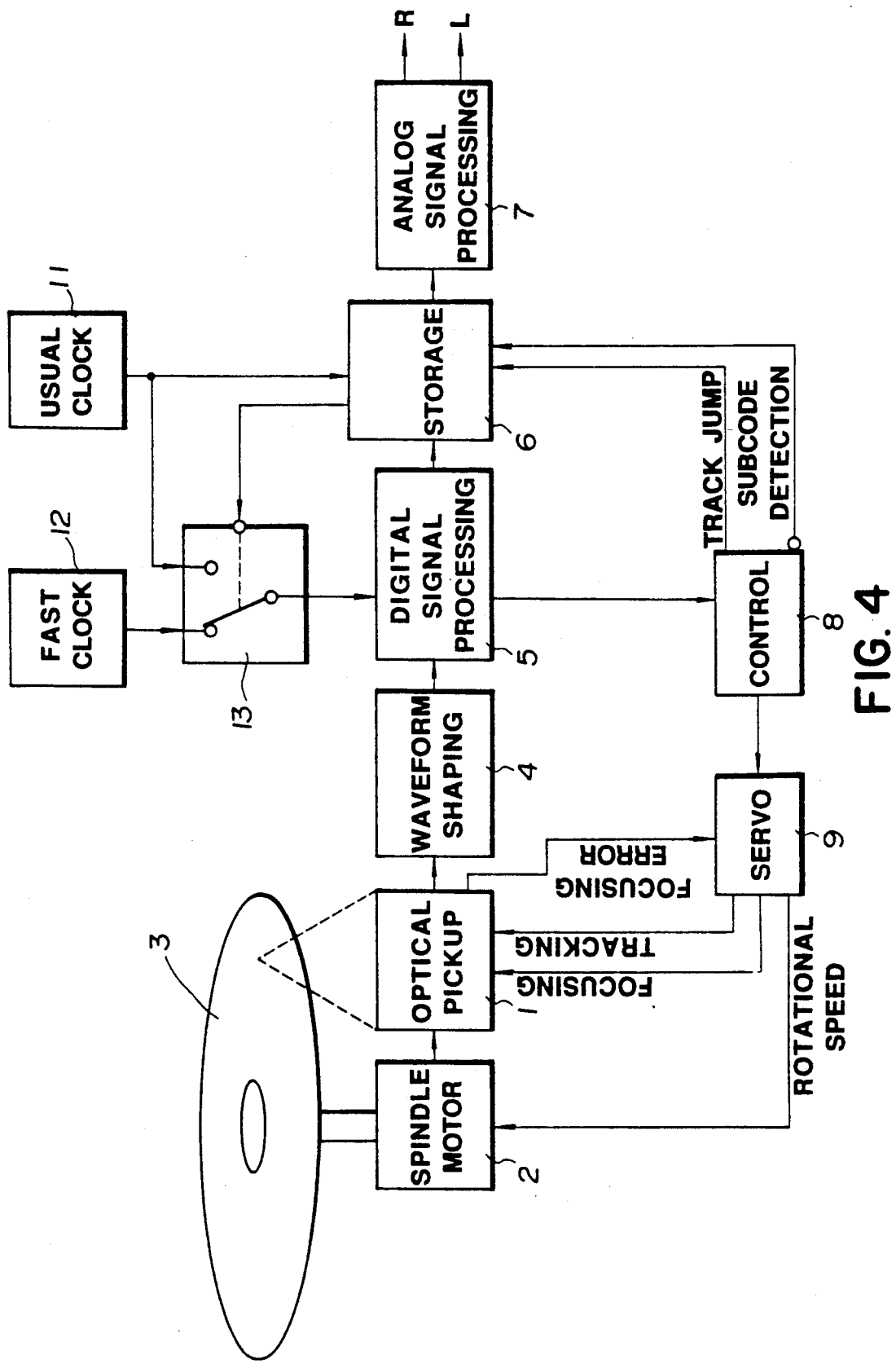
FIG. 4 is a block diagram showing the construction of a CD player according to a second embodiment of the present invention.
Figure 5:
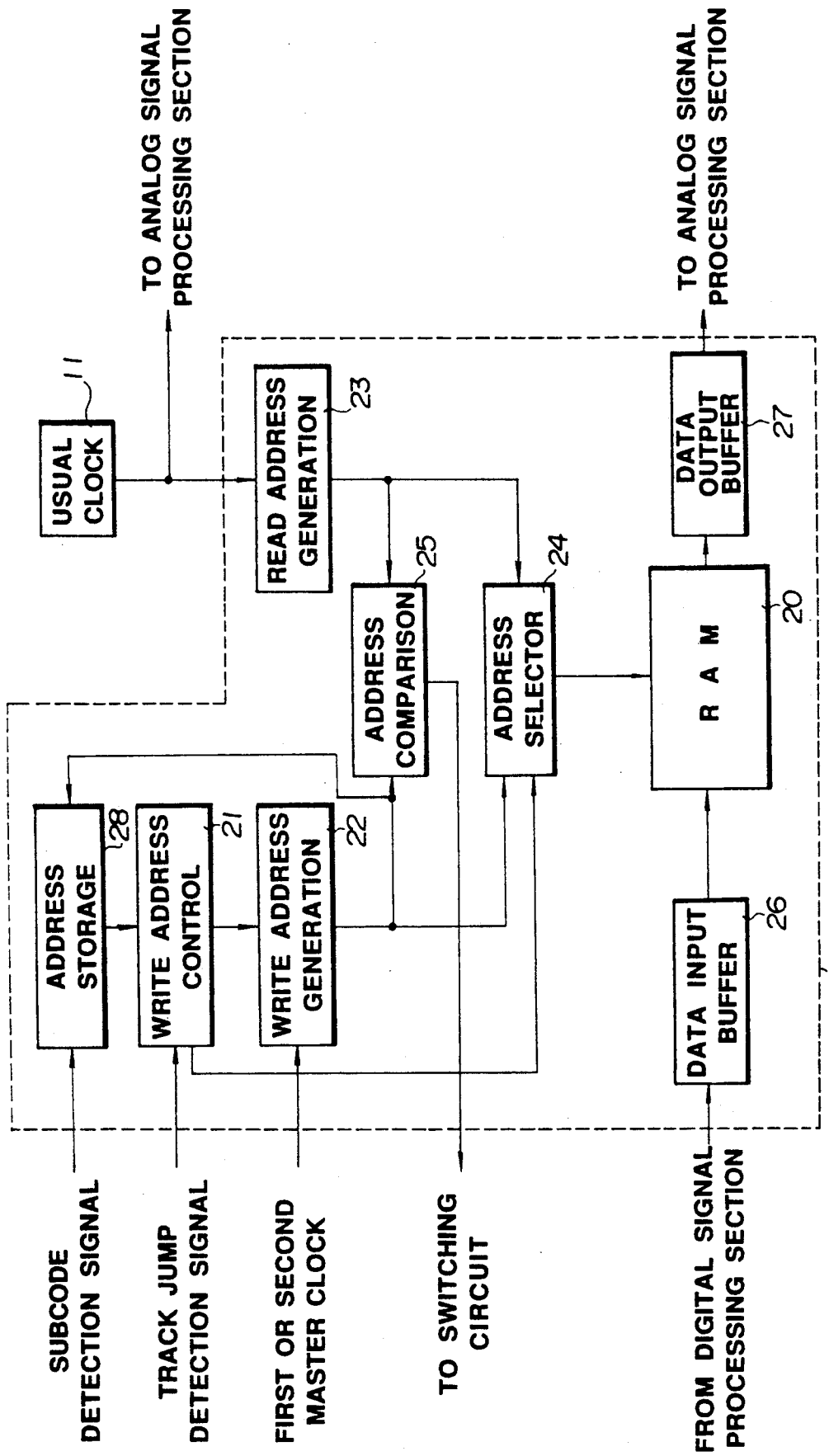
FIG. 5 is a block diagram showing the construction of the memory part of the CD player shown in FIG. 4.

FIG. 4 shows in a block diagram a CD player according to a second embodiment of the present invention and FIG. 5 shows in a block diagram the construction of the memory section 6 in the CD player shown in FIG. 4.

In FIGS. 4 and 5, the same or equivalent parts as those shown in FIGS. 1 and 2 are indicated by the same numerals as in FIGS. 1 and 2, and only the parts or components different from FIGS. 1 and 2 are explained for avoiding redundant description.

With the CD player of the first embodiment, the track jump detection signal is generated from the play signal and the mute signal output from the controller 8 so as to be supplied to the memory section 6. However, with the CD player of the present second embodiment, a detection signal of the track jump of the light spot and the detection signal of the subcode of digital data detected from CD 3 are supplied from the controller 8 to the memory section 6, as shown in FIG. 4. An address memory 28 is included in the memory section 6, as shown in FIG. 5, so as to be supplied with the subcode detection signal.

The address memory 28 is adapted for latching write address data output from the write address generator 22, with the subcode detection signal as the latch timing signal. Hence, in case of the track jump of the light spot, the write address data just ahead of track jump when the subcode ceases to be detected are stored in the address memory section 28. The write address data just ahead of track jump are supplied to the write address generator 22 by means of the write address controller 21, such that, when the light spot reverts from the track jump and the write address generator 22 is again actuated, audio data start to be output from this write address on.

In this manner, after the light spot reverts from the track jump, audio data from the digital signal processing section 5 are written from the address just ahead of the preceding track jump, so that no unusual data are left in RAM 20 even if the interruption of the operation of the write address generator 22 is delayed.

With the optical disk reproducing apparatus of the present invention, digital data reproduced from the optical disk are written in memory means so as to be read and output after lapse of a time interval not shorter than a time period necessary for the light spot to reset at least from track jump. Hence, on occurrence of a track jump, a continuous playback output may be obtained by continuously reading out and outputting digital data from the memory means.

In addition, with the present optical disk reproducing apparatus, the optical disk is reproduced at an elevated speed for a predetermined period after reversion of the light spot to a position just ahead of the track jump, so that digital data may be quickly replenished in the above memory means in readiness for the next track jump.

With such optical disk reproducing apparatus, a perpetually continuous playback output may be obtained even on occurrence of a track jump as a result of vibrations or the like so that the vibration damping mechanism may be simplified. The optical reproducing apparatus may be advantageously employed with portable CD players or CD players mounted on vehicles where severe vibrations are encountered.

What is claimed is:

1. An optical disk reproducing apparatus in which an optical disk is rotated at a first rotational speed on the basis of a first master clock signal and a light spot is irradiated on said optical disk for reproducing digital data comprising:
    memory means into and from which digital data reproduced from said optical disc are sequentially written and read out, respectively,
    track jump detection means detecting a track jump of said light spot during reproduction from a desired position to an undesired position on said optical disk caused by an external mechanical shock and for generating a track jump detection signal,
    resetting means for resetting said light spot to a position just ahead of said track jump upon receiving said track jump detection signal from said track jump detection means,
    second master clock generating means for generating a second master clock signal of a higher frequency than said first master clock signal, and
    control means for continuously reading out digital data stored in said memory means on the basis of said first master clock signal on detection of a track jump by said track jump detection means, said control means causing rotation of said optical disk at a second rotational speed higher than said first rotational speed on the basis of said second master clock signal for a predetermined period after resetting of said light spot by said resetting means and writing the reproduced digital data in said memory means on the basis of said second master clock signal,
    wherein said memory means includes a RAM for storing said digital data in a predetermined address, a write generating means selectively supplied with said first or second master clock signals for generating write addresses for writing in said RAM, read address generating means supplied with said first master clock signal for generating readout addresses for reading from said RAM, said readout addresses being the same addresses as the write addresses generated by said write generating means with a delay of a predetermined period longer than a time period necessary for resetting said light spot by said resetting means, and address comparison means for comparing write addresses generated by said write address generating means with readout addresses generated by said readout address generating means and responsive to a compared difference therebetween to generate a control signal for selecting said first or second master clock signals supplied to said write address generating means.

2. The optical disk reproducing apparatus according to claim 1 wherein said memory means further includes an address selector for selectively supplying said write addresses or readout addresses to said RAM, and write address control means responsive to said track jump detection signal supplied thereto to generate control signals inhibiting writing into said RAM.

3. The optical disk reproducing apparatus according to claim 2 wherein said RAM has a memory capacity at least capable of storing digital data read out during the time period necessary for said resetting of said light spot in response to said track jump detection signal.

4. The optical disk reproducing apparatus according to claim 2 further comprising address memory means including means for detecting control data recorded on said optical disk and generating a subcode detection signal, and address storage means for storing write addresses generated by said write address generating means upon detection of said subcode detection signal.

5. The optical disk reproducing apparatus according to claim 1 wherein said track jump detection means monitors digital data reproduced from said optical disk to generate said track jump detection signal when regular digital data are not reproduced.

* * * * *